United States Patent Office 2,887,506
Patented May 19, 1959

2,887,506

METHOD FOR THE MANUFACTURE OF O-ARYL O-LOWER ALKYL PHOSPHOROCHLORIDOTHIO-ATES

Henry Tolkmith, Etcyl H. Blair, Kenneth C. Kauer, and Edgar C. Britton, all of Midland, Mich., assignors to The Dow Chemical Company, Midland, Mich., a corporation of Delaware No Drawing. Application October 24, 1957
Serial No. 692,057

6 Claims. (Cl. 260—461)

The present invention is concerned with an improved method for the manufacture of O-aryl O-lower alkyl phosphorochloridothioates of the formula

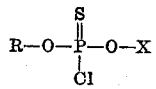

In this and succeeding formulae, X represents a lower-alkyl radical and R represents an aryl radical. The term "aryl" as herein employed refers to the aromatic radicals whether unsubstituted or substituted with one or more substituents including chlorine, bromine, alkyl, alkoxy, nitro, cyclohexyl, benzyl and phenyl. The term "lower-alkyl" refers to alkyl radicals containing from one to three carbon atoms, inclusive. These compounds are valuable as intermediates for the preparation of more complex phosphorus derivatives and particularly for the production of O-aryl O-alkyl phosphoroamidothioates. In such use, the O-aryl O-alkyl phosphorochloridothioate intermediate is reacted with ammonia or an amine at a temperature of from about 0° to 110° C. to produce the O-aryl O-alkyl phosphoroamidothioate. The latter compounds and the O-aryl O-alkyl phosphorochloridothioates are useful as preservatives for paper, paint and wood and as parasiticides for the control of bacteria, fungi, mites and insect pests, such as aphids, southern army worms, Mexican bean beetles and flies.

Several methods for preparing the O-aryl O-alkyl phosphorochloridothioates are known. For instance, certain of the compounds may be prepared by reacting an O-aryl phosphorodichloridothioate with a lower-alkanol in the presence of a hydrogen chloride acceptor such as pyridine. In another known method, the compounds are prepared from the reaction of an O-aryl phosphorodichloridothioate with an alkali metal alcoholate. The contacting of the reactants in such methods is carried out at a temperature of from about 15° to 110° C. Following the reaction, the reaction mixture may be filtered to separate alkali metal chloride or pyridine hydrochloride and obtain an O-aryl O-alkyl phosphorochloridothioate product as the filtrate.

The purity and yields of the O-aryl O-lower-alkyl phosphorochloridothioate products as obtained by these known procedures have not been entirely satisfactory due to the formation of other phosphorus derivatives, including triesters of phosphoric acid, during the course of the reaction. The impurities have suppressed the yields and purities of the O-aryl O-lower-alkyl phosphoroamidothioates obtained from the amidation of these O-aryl O-lower-alkyl phosphorochloridothioate products. Thus, an improved method for the production of O-aryl O-lower-alkyl phosphorochloridothioates is desirable.

It is an object of the present invention to provide an improved method for the production of O-aryl O-lower-alkyl phosphorochloridothioates. It is a further object to provide a method which gives O-aryl O-lower-alkyl phosphorochloridothioate products of a better purity and in a greater yield than has previously been obtainable by known methods. Another object is to provide a method which gives O-aryl O-lower-alkyl phosphorochloridothioate products from which O-aryl O-lower-alkyl phosphoroamidothioates may be prepared in a yield and purity not previously obtainable by known methods. An additional object is the provision of a method wherein the formation of undesirable phosphate impurities is kept at a minimum. Other objects will become apparent from the following specification and claims.

The new process comprises reacting as sole reagents a lower alkanol and an O-aryl phosphorodichloridothioate of the formula

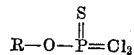

at a temperature at which hydrogen chloride is formed as a product of reaction while continuously withdrawing the hydrogen chloride in the gaseous state from the reaction mixture as formed, said temperature being at least 15 centigrade degrees below the boiling point at 760 millimeters pressure of the employed alkanol. When the formation of hydrogen chloride of reaction is substantially complete, the reaction mixture may be partially distilled under reduced pressure to separate low boiling constituents and obtain as a residue the desired O-aryl O-lower alkyl phosphorochloridothioate. These products are obtained as crystalline solids or viscous liquids which are somewhat soluble in many organic solvents and of very low solubility in water. This new method gives the O-aryl O-lower alkyl phosphorochloridothioates in a yield and purity not previously obtainable by known methods.

Although the details of the reaction mechanisms are not completely understood, the reaction when carried out under the described conditions results in the substitution of one of the chlorine atoms of the O-aryl phosphorodichloridothioate with an alkoxy group and the formation of hydrogen chloride of reaction. The reaction might be represented as taking place in accordance with the following equation.

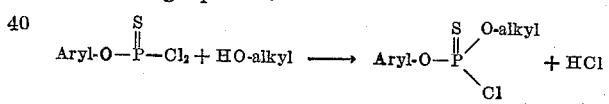

For the preparation of the O-aryl O-lower alkyl phosphorochloridothioates, it is essential and critical that the reaction be carried out while continuously withdrawing hydrogen chloride in the gaseous state from the reaction mixture as formed. Thus, the reaction is carried out under reduced pressure, or while passing an inert gaseous entraining agent through the reaction mixture, or in the presence of an inert solvent having an inherent low solvent power for hydrogen chloride. Such conditions effect the continuous withdrawal of hydrogen chloride from the reaction system as formed. Suitable gaseous entraining agents include nitrogen, methyl chloride, carbon dioxide or air, while suitable solvents include the hydrocarbon and halohydrocarbon solvents boiling at temperatures not to exceed 165° C. such as methylene dichloride, methylene dibromide, ethylene dichloride, chloroform, carbon tetrachloride, benzene, chlorobenzene or toluene. When employing one or more of the solvents to effect the withdrawal of hydrogen chloride, good results are obtained with an amount of solvent equal to at least one-half mole per mole of the employed O-aryl phosphorodichloridothioate reagent.

In the preparation of the O-aryl O-lower alkyl phosphorochloridothiates, good results are obtained when one molecular proportion of the O-aryl phosphorodichloridothioate is reacted with from 1 to 7 molecular proportions of the lower alkanol. When employing such proportions, it is essential that any amount of lower alkanol in excess of six molecular proportions be added gradually portionwise to the phosphorodichloridothioate reagent. Other modes of addition of the lower alkanol in excess of six molecular proportions should not be employed as they materially reduce the yields and purity of the desired products. In a preferred method of operation, one mole of the phosphorodichloridothioate reagent is reacted with at least two moles of the alkanol in the presence of one or more of the aforementioned solvents or with from 1 to 4 molecular proportions of the alkanol under reduced pressure or while passing a gaseous entraining agent through the reaction mixture. Such proportions give the desired products in maximum yield and purity.

It is essential and critical that the reaction of the present invention be carried out at a temperature of at least 15 or more centigrade degrees below the boiling point at 760 millimeters pressure of the employed alkanol, and preferably at the temperature range from 15° C. to the above maximum temperature. The reaction takes place smoothly under these temperature conditions with the formation of the desired products and hydrogen chloride of reaction. Temperatures significantly in excess of the maximum temperature as above described materially effect the course of the reaction and should not be employed for any appreciable period of time if it is desired to obtain the O-aryl O-lower alkyl phosphorochloriodthioates in good purity and high yields. The reaction is somewhat exothermic and the temperature may be controlled by regulating the rate of contacting the reactants and by external cooling.

The reaction may be carried out under such conditions that the reaction mixture boils. Thus, the reaction may be carried out in one of the previously described inert solvents boiling in the afore-described temperature range, or under such reduced pressure that the reaction mixture boils in the afore-described temperature range.

The rate at which the reaction takes place has been found to vary directly with the temperature employed and also to vary with the particular reactants employed. For example, the rate of reaction decreases as the number of carbon atoms increases in the employed alkanol. On the other hand, the O-aryl phosphorodichloridothioates containing halogen or nitro in the O-aryl structure react with the lower alkanols more rapidly than the other O-aryl phosphorodichloridothioates. The reaction is usually carried out over a period of from 1 to 20 hours, the formation of hydrogen chloride of reaction being substantially complete in such a period.

In carrying out the process of the present invention, the required amounts of the reagents may be mixed together and maintained for a period under the aforedescribed temperature conditions while continuously withdrawing hydrogen chloride in the gaseous state from the reaction mixture as formed. When the formation of hydrogen chloride is substantially complete, the reaction mixture may be distilled under reduced pressure at temperatures up to 15° C. below the boiling point at 760 millimeters pressure of the employed alkanol to separate excess alkanol and thereafter at temperatures up to 90° C. to separate low boiling constituents such as inert solvent and obtain the desired O-aryl O-lower alkyl phosphorochloridothioate as a liquid or crystalline residue. The term "lower alkanol" as herein employed refers to the aliphatic alcohols containing from 1 to 3 carbon atoms, inclusive.

The following examples illustrate the invention but are not to be construed as limiting.

EXAMPLE 1

O-(2,4,6-trichlorophenyl) O-methyl phosphorochloridothioate

A solution of 44 grams (1.375 moles) of methanol in 100 milliliters of chlorobenzene was added portionwise over a period of about seven hours to 75 grams (0.227 mole) of O-(2,4,6-trichlorophenyl) phosphorodichloridothioate (boiling at 140°–144° C. at three millimeters pressure) dissolved in 100 milliliters of chlorobenzene. During the addition which was carried out at the boiling temperature of the reaction mixture (15° to 20° C.) and under a pressure of from 60 to 80 millimeters, a small current of air was bubbled through the reaction mixture. Following the addition, the reaction mixture was maintained at room temperature for about 18 hours. The contacting period was accompanied by the liberation of hydrogen chloride of reaction. Toward the end of the reaction, no further substantial amounts of hydrogen chloride were liberated. Following the reaction, the mixture was distilled at 20 millimeters pressure at temperatures gradually increasing up to 80° C. to separate low boiling constituents and to obtain as a residue an O-(2,4,6-trichlorophenyl) O-methyl phosphorochloridothioate product in a 91 percent yield. The latter product was a crystalline solid melting at 64°–66° C.

When a portion of this phosphorochloridothioate product was reacted with excess ammonia in chlorobenzene as reaction solvent and at a temperature of from 5° to 15° C., an O-(2,4,6-trichlorophenyl) O-methyl phosphoroamidothioate was obtained as a crystalline solid melting at 68.5° C. The yield of this phosphoroamidothioate as based upon the O-(2,4,6-trichlorophenyl) phosphorodichloridothioate starting material was 89 percent.

EXAMPLE 2

O-(2,4,5-trichlorophenyl) O-methyl phosphorochloridothioate

Ninety-six grams (3 moles) of methanol was mixed with 496.5 grams (1.5 moles) of O-(2,4,5-trichlorophenyl) phosphorodichloridothioate (boiling at from 130° to 136° C. at two to three millimeters pressure) dissolved in 500 milliliters of methylene chloride and the resulting solution heated with stirring at the boiling temperature (40° to 41° C.) until the evolution of hydrogen chloride of reaction was substantially complete. The heating was carried out under reflux to prevent the escape of methanol, and over a period of about eleven hours. Following the reaction, the mixture was distilled under reduced pressure and at temperatures gradually increasing up to 65° C. at a pressure of ten millimeters to separate low boiling constituents and to obtain as a liquid residue an O-(2,4,5-trichlorophenyl) O-methyl phosphorochloridothioate product. This product was obtained in a yield of 99 percent based upon the phosphorodichloridothioate starting material, and had a density of 1.5556 at 25° C. and a refractive index n/D of 1.5818 at 25° C. Upon standing at room temperature this liquid product crystallized. A portion of the crystallized product was recrystallized from a petroleum ether boiling at from 30° to 60° C. and found to have a melting point of 37°–38° C..

EXAMPLE 3

O-(2,4,5-trichlorophenyl) O-ethyl phosphorochloridothioate

One mole of ethanol was mixed with 0.5 mole of O-(2,4,5-trichlorophenyl) phosphorodichloridothioate dissolved in 597 grams of chloroform and the resulting solution heated at a temperature of from 61° to 63° C. until the evolution of hydrogen chloride of reaction was substantially complete. The heating was carried out with stirring and over a period of nine hours. Following the reaction, the mixture was distilled under reduced pressure and at temperatures gradually increasing up to a temperature of 70° C. and a pressure of 20 millimeters to separate low boiling constituents and to obtain as a residue an O-(2,4,5-trichlorophenyl) O-ethyl phosphorochloridothioate product in a yield of 94 percent. This product was a colorless liquid having a density of 1.4948 at 25° C. and a refractive index n/D of 1.5689 at 25° C.

When a portion of the above phosphorochloridothioate product was reacted with excess ammonia in benzene as reaction solvent and at a temperature of 10° C., an O-(2,4,5-trichlorophenyl) O-ethyl phosphoroamidothioate product was obtained as a crystalline solid melting at 54°–56° C. The yield of this phosphoroamidothioate was 85 percent as based upon the O-(2,4,5-trichlorophenyl) phosphorodichloridothioate starting material.

EXAMPLE 4

Ethanol (0.93 mole) and 0.465 mole of O-(2,4,5-trichlorophenyl) phosphorodichloridothioate was dissolved in five moles of chloroform and the resulting solution heated at the boiling temperature (61° C.) and under reflux until the evolution of hydrogen chloride of reaction was substantially complete. The heating was carried out with agitation and over a period of 10.5 hours. Following the reaction, the mixture was distilled under reduced pressure and at temperatures gradually increasing up to a temperature of 70° C. at a pressure of ten millimeters to separate low boiling constituents and to obtain as a residue an O-(2,4,5-trichlorophenyl) O-ethyl phosphorochloridothioate product in a yield of 99 percent.

When a portion of this phosphorochloridothioate product was reacted with excess ethylamine in benzene as reaction solvent and at a temperature of 10° C., an O-(2,4,5-trichlorophenyl) O-ethyl N-ethyl phosphoroamidothioate product was obtained as a viscous liquid. The yield of this product was 83 percent as based upon the O-(2,4,5-trichlorophenyl) phosphorodichloridothioate starting material. Combustion analysis of the product gave percentage contents of chlorine, nitrogen, phosphorus and sulphur of 30.5, 3.86, 8.77, and 9.0, respectively, as compared to theoretical contents of 30.54, 4.01, 8.88 and 9.19. The liquid product had a density of 1.3745 at 25° C. and a refractive index $n/D$ of 1.5615 at 25° C.

EXAMPLE 5

O-(2,4-dichlorophenyl) O-ethyl phosphorochloridothioate

One half mole (148 grams) of O-(2,4-dichlorophenyl) phosphorodichloridothioate (boiling at 154° C. at 10 millimeters pressure) was mixed with 1.03 mole (47.4 grams) of ethanol and 300 milliliters of methylene dichloride at a temperature of 18° C. The mixture was then stirred for a period of 40 minutes as the temperature gradually rose to 40° C., and thereafter warmed to a temperature of about 45° C. and maintained at a temperature of from 42° to 45° C. for a period of six hours. Following the latter period, the reaction mixture was placed under reduced pressure at room temperature for eight hours and thereafter washed with water. The washed product was fractionally distilled at temperatures gradually increasing up to a temperature of 30° C. at 10 millimeters pressure to separate low boiling constituents and obtain an O-(2,4-dichlorophenyl) O-ethyl phosphorochloridothioate product as a colorless liquid residue. This product was obtained in a yield of 87.5 percent and had a density of 1.4549 at 25° C. and a refractive index $n/D$ of 1.5642 at 25° C.

EXAMPLE 6

O-(2-chloro-4-nitrophenyl) O-methyl phosphorochloridothioate

Methanol (3.5 moles) was added slowly portionwise with stirring to 0.25 mole of O-(2-chloro-4-nitrophenyl) phosphorodichloridothioate (having a density of 1.6127 at 20° C. and a refractive index $n/D$ of 1.6094 at 20° C.). The addition was carried out at a pressure of from 220–240 millimeters and at a boiling temperature (50° C.) of the reaction mixture. During the addition some of the excess methanol was continuously distilled out of the reaction zone together with hydrogen chloride of reaction as formed. At no time during the reaction was there more than 0.2 mole of methanol present in the reaction mixture. After 5.5 hours the evolution of hydrogen chloride was substantially complete. The reaction mixture was then distilled under 40 to 50 millimeters pressure and at a temperature of from 40° to 50° C. to separate low boiling constituents and obtain an O-(2-chloro-4-nitrophenyl) O-methyl phosphorochloridothioate product as an oily liquid. This product was obtained in a yield of 97 percent and had a density of 1.5335 at 25° C., a refractive index $n/D$ of 1.5888 at 20° C. and phosphorus, sulfur and chlorine contents of 10.38, 10.63 and 22.1 percent, respectively, as compared to theoretical contents of 10.25, 10.6 and 23.5 percent.

When a portion of the above phosphorochloridothioate product was reacted with excess ammonia at a temperature of from 3° to 12° C. an O-(2-chloro-4-nitrophenyl) O-methyl phosphoroamidothioate product was obtained in a yield of 82 percent as based upon the phosphorodichloridothioate starting material. O-(2-chloro-4-nitrophenyl) O-methyl phosphoroamidothioate melts at 41°–43° C.

EXAMPLE 7

O-(2,5-dichlorophenyl) O-methyl phosphorochloridothioate

One hundred fifty milliliters of methanol was added portionwise with stirring to 43 grams (0.145 mole) of O-(2,5-dichlorophenyl) phosphorodichloridothioate (boiling at 126°–135° C. at four millimeters pressure) for a period of about 15 minutes. The addition was carried out at a pressure of about 200 millimeters and at the boiling temperature of the reaction mixture (40°–45° C.). During the addition some of the excess methanol was continuously distilled out of the reaction zone together with hydrogen chloride of reaction as formed. During the addition there was never more than 0.3 moles of methanol present in the reaction mixture. Following the addition the mixture was set aside under reduced pressure for about one half hour and thereafter distilled at 40 to 50 millimeters pressure at gradually increasing temperatures up to a temperature of 65° C. to separate low boiling substituents and obtain an O-(2,5-dichlorophenyl) O-methyl phosphorochloridothioate product as a liquid residue. This product was obtained in a yield of 98 percent based upon the phosphorodichloridothioate starting material.

When a portion of this product was reacted with excess ammonia at a temperature of from 3° to 7° C., O-(2,5-dichlorophenyl) O-methyl phosphoroamidothioate product was obtained as a crystalline solid in a yield of 93 percent based upon the O-(2,5-dichlorophenyl) phosphorodichloridothioate starting material. O-(2,5-dichlorophenyl) O-methyl phosphoroamidothioate melts at 61°–62° C.

EXAMPLE 8

O-(4-chlorophenyl) O-methyl phosphorochloridothioate

Nine hundred milliliters of methanol was added portionwise with stirring to 156.8 grams (0.6 mole) of O-(4-chlorophenyl) phosphorodichloridothioate (boiling at 131°–138° C. at five millimeters pressure) over a period of 1.25 hours. The addition was carried out under reduced pressure and at the boiling temperature of the reaction mixture (40°–50° C.). During the addition some of the methanol was continuously distilled out of the reaction zone together with hydrogen chloride of reaction as formed. At no time during the addition was there more than 1.0 mole of methanol present. At the end of the addition the evolution of hydrogen chloride of reaction was substantially complete. The reaction mixture was then concentrated in the previously described manner to obtain an O-(4-chlorophenyl) O-methyl phosphorochloridothioate product as a residue. This product was obtained in a yield of 99 percent and was a viscous liquid having a specific gravity of 1.3963 at 25° C. and a refractive index $n/D$ of 1.5581 at 25° C.

When a portion of the above phosphorochloridothioate was reacted with excess ammonia, an O-(4-chlorophenyl) O-methyl phosphoroamidothioate product was obtained in a yield of 92 percent based upon the phosphorodichloridothioate starting material. This product was a yellow liquid having a specific gravity of 1.357 at 25° C., a refractive index n/D of 1.5708 at 25° C., and chlorine, sulphur, phosphorus and nitrogen contents of 14.78, 13.5, 13.13 and 5.63 percent, respectively, as compared to theoretical contents of 14.9, 13.5, 13.1 and 5.9 percent.

EXAMPLE 9

*O-(2,4-dichlorophenyl) O-ethyl phosphorochloridothioate*

Four moles of ethanol was added gradually portionwise with stirring and over a period of three hours to one mole of O-(2,4-dichlorophenyl) phosphorodichloridothioate. The addition was carried out at a pressure of 250 millimeters and at a temperature of from 25° to 30° C. Stirring was then continued for a period of 1.5 hours at the end of which the mixture was set aside at room temperature for 12 hours and under a pressure of 15 millimeters. The reaction mixture was then diluted with diethyl ether, washed with water and the washed product fractionally distilled under reduced pressure to remove low boiling constituents. As a result of this operation there was obtained an O-(2,4-dichlorophenyl) O-ethyl phosphorochloridothioate product as a water clear liquid residue in a yield of 81 percent.

EXAMPLE 10

*O-(2,4-dichlorophenyl) O-methyl phosphorochloridothioate*

Five moles of methanol is added slowly portionwise with stirring to one mole of O-(2,4-dichlorophenyl) phosphorodichloridothioate at a temperature of 35° C. During the addition, which is carried out over a period of six hours, a current of air is bubbled through the reaction mixture. The addition is accompanied by the evolution of hydrogen chloride of reaction. Toward the end of the addition, no further substantial amounts of hydrogen chloride are liberated. The reaction mixture is then distilled at 20 millimeters pressure at temperatures gradually increasing up to 80° C. to separate low boiling constituents and to obtain as a liquid residue an O-(2,4-dichlorophenyl) O-methyl phosphorochloridothioate product in a yield of 90 percent.

EXAMPLE 11

Similarly, the following O-aryl, O-lower alkyl phosphorochloridothioate products were prepared in a yield greater than 90 percent based upon the phosphorodichloridothioate as starting material.

O-phenyl O-methyl phosphorochloridothioate
O-(3-ethylphenyl) O-methyl phosphorochloridothioate
O-(4-nonylphenyl) O-methyl phosphorochloridothioate
O-(4-secondarybtuylphenyl) O-methyl phosphorochloridothioate
O-(4-tertiarybutylphenyl) O-methyl phosphorochloridothioate
O-(4-methylphenyl) O-methyl phosphorochloridothioate
O-(3,4-dimethylphenyl) O-methyl phosphorochloridothioate
O-(2,5-dimethylphenyl) O-methyl phosphorochloridothioate
O-(4-tertiarybutyl-2-methylphenyl) O-methyl phosphorochloridothioate
O-(2-bromo-4-tertiarybutylphenyl) O-methyl phosphorochloridothioate
O-(2-chloro-4-tertiarybutylphenyl) O-methyl phosphorochloridothioate
O-(3,5-dimethylphenyl) O-methyl phosphorochloridothioate
O-(4-chloro-2-cyclohexylphenyl) O-methyl phosphorochloridothioate
O-(2-cyclohexylphenyl) O-methyl phosphorochloridothioate
O-(3-phenylphenyl) O-methyl phosphorochloridothioate
O-(2-phenylphenyl) O-methyl phosphorochloridothioate The O-aryl phosphorodichloridothioates employed as starting materials in the present method may be prepared by reacting a molecular excess of thiophosphoryl chloride with an alkali metal salt of phenol or a suitably substituted phenol. Good results are obtained when employing from two to four moles of thiophosphoryl chloride with each mole of the alkali metal salt. In carrying out the reaction, the phenolate, preferably as the sodium salt, is added portionwise with stirring to the thiophosphoryl chloride and the resulting mixture subsequently warmed for a short time to complete the reaction. The crude reaction mixture is then filtered and the filtrate fractionally distilled under reduced pressure to separate the desired starting material.

We claim:

1. A method for preparing an O-aryl O-lower alkyl phosphorochloridothioate which comprises reacting from one to seven molecular proportions of a lower alkanol with one molecular proportion of an O-aryl phosphorodichloroidothioate at a temperature at which no more than one mole of hydrogen chloride is formed as a product of reaction while continuously withdrawing the hydrogen chloride in the gaseous state from the reaction mixture as formed, said temperature being at least 15 centigrade degrees below the boiling point at 760 millimeters pressure of the employed alkanol and the aryl in said O-aryl O-lower alkyl phosphorochloridothioate and O-aryl phosphorodichloridothioate representing a phenyl radical whose nucleus may be substituted with a radical selected from the group consisting of chlorine, bromine, alkyl, nitro, cyclohexyl and phenyl.

2. A method claimed in claim 1 wherein the O-aryl phosphorodichloridothioate is O-(2,4,5-trichlorophenyl) phosphorodichloridothioate.

3. A method claimed in claim 1 wherein the O-aryl phosphorodichloridothioate is O-(2,4-dichlorophenyl) phosphorodichloridothioate.

4. A method claimed in claim 1 wherein the O-aryl phosphorodichloridothioate is O-(3,4-dichlorophenyl) phosphorodichloridothioate.

5. A method claimed in claim 1 wherein the O-aryl phosphorodichloridothioate is O-(2-chloro-4-nitrophenyl) phosphorodichloridothioate.

6. A method claimed in claim 1 wherein the O-aryl phosphorodichloridothioate is O-(2-chloro-4-tertiarybutylphenyl) phosphorodichloridothioate.

References Cited in the file of this patent

UNITED STATES PATENTS

| | | |
|---|---|---|
| 1,869,768 | Nicolai et al. | Aug. 2, 1932 |
| 2,071,017 | Bass | Feb. 16, 1937 |